United States Patent [19]
Török

[11] Patent Number: 5,117,144
[45] Date of Patent: May 26, 1992

[54] ELECTRIC MOTOR

[76] Inventor: Vilmos Török, Carl Milles väg 7, 181 34 Lidingö, Sweden

[21] Appl. No.: 651,407
[22] PCT Filed: Aug. 24, 1989
[86] PCT No.: PCT/SE89/00443
§ 371 Date: Feb. 25, 1991
§ 102(e) Date: Feb. 25, 1991
[87] PCT Pub. No.: WO90/02437
PCT Pub. Date: Mar. 8, 1990

[30] Foreign Application Priority Data

Aug. 25, 1988 [SE] Sweden ................. 8802972

[51] Int. Cl.$^5$ ............ H02K 1/24; H02K 1/12
[52] U.S. Cl. .................. 310/269; 310/154; 310/254; 310/261
[58] Field of Search ......... 310/269, 257, 263, 156, 310/168, 46, 49 R, 49 A, 154, 254, 261; 318/701

[56] References Cited

U.S. PATENT DOCUMENTS

| | | | |
|---|---|---|---|
| 2,519,097 | 7/1947 | Allen | 310/168 |
| 3,209,224 | 9/1965 | Guinard | 310/168 |
| 3,383,533 | 5/1968 | Jarret et al. | 310/168 |
| 3,466,479 | 9/1969 | Jarret et al. | 310/168 |
| 3,573,519 | 4/1971 | Kumazawa | 310/156 |
| 4,629,924 | 12/1986 | Grosjean | 310/257 |
| 4,947,066 | 8/1990 | Ghibu et al. | 310/269 |
| 4,972,114 | 11/1990 | Frister | 310/263 |
| 4,977,344 | 12/1990 | Obradovic | 310/269 |
| 5,023,502 | 6/1991 | Johnson | 310/261 |

FOREIGN PATENT DOCUMENTS

| | | | |
|---|---|---|---|
| 0150324 | 11/1984 | European Pat. Off. | 318/701 |
| 2707684 | 8/1978 | Fed. Rep. of Germany | 310/168 |
| 1600380 | 6/1977 | United Kingdom | 310/168 |

Primary Examiner—Steven L. Stephan
Assistant Examiner—Matthew Nguyen
Attorney, Agent, or Firm—Browdy and Neimark

[57] ABSTRACT

An electric motor with solely one direction of rotation and electronic speed control, includes two mutually rotatable parts with ferromagnetic cores separated by an air gap. The stator core is provided with a peripherally extending ring of magnet pole groups each including at least one pair of salient magnet poles, the one being ferromagnetic and the other permanently magnetic. All magnet pole groups are connected magnetically to a common magnetizing winding, which magnetizes all magnet pole groups simultaneously in a manner such that the ferromagnetic pole and the permanent pole of each group is magnetized in the same direction. The rotor core is provided with a peripherally extending ring of salient ferromagnetic reluctance poles with twice the pole pitch of the stator. Each reluctance pole has a width which over a part of the pole corresponds to a stator pole pitch which over the remaining part of the reluctance pole is smaller, so that each reluctance pole presents a part which projects in a predetermined peripheral direction common to all reluctance poles.

13 Claims, 3 Drawing Sheets

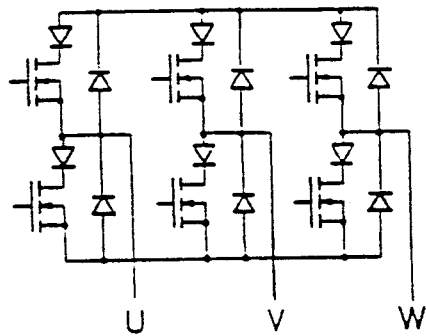
Fig. 1
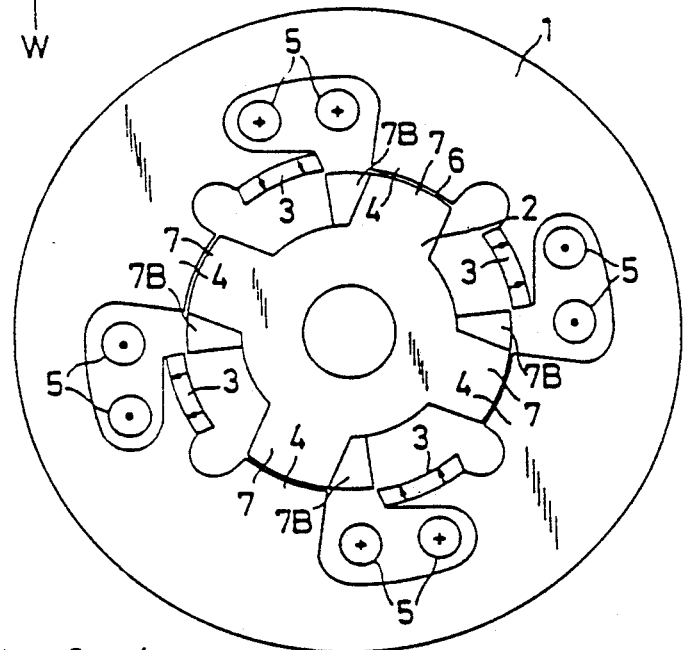
Fig. 2
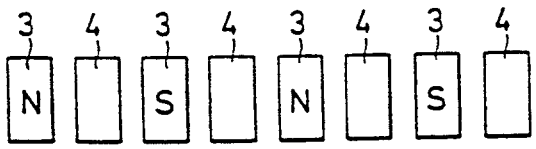
Fig. 3
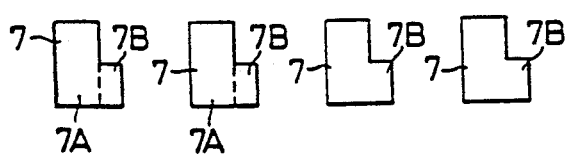
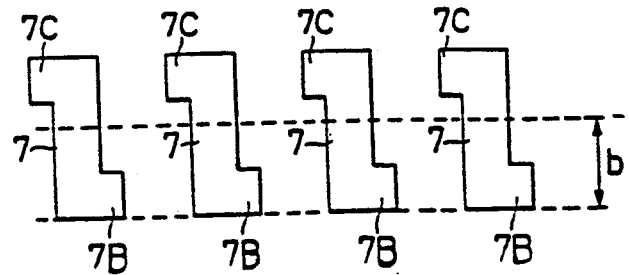
Fig. 4

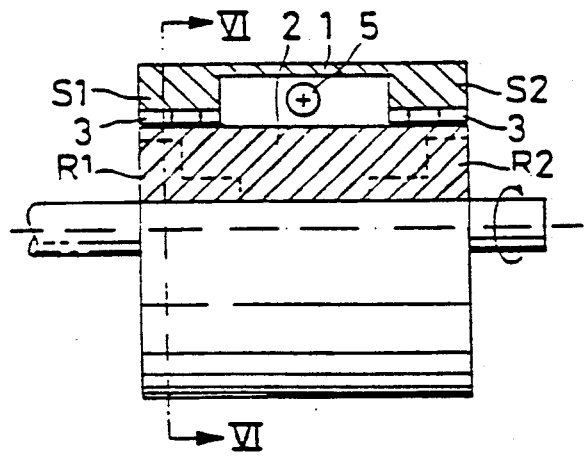
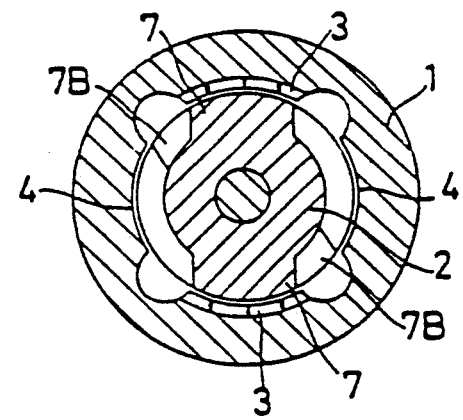
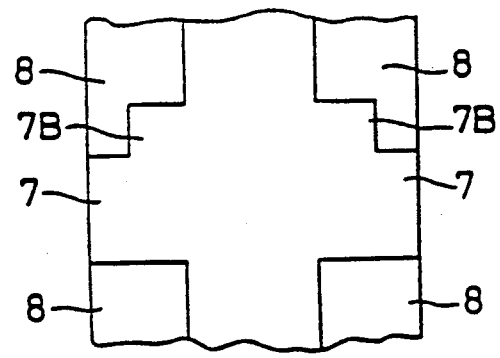

ELECTRIC MOTOR

The present invention relates to an electric motor which is of the kind defined in the preamble of claim 1 and which can be supplied with current and its speed controlled by a simple electronic circuit and which has a single, pre-determined direction of rotation. The invention also relates to an appropriate electronic supply and control arrangement for use with such a motor.

There are several very wide areas of use in which electric motors need rotate only in one direction. Such areas include the drive motors of fans, pumps, centrifuges compressors and different domestic electrical appliances, and also many other usages. It would be highly beneficial in the case of many of these electric motor drives to be able to vary the speed of the motor in a controllable manner and/or to be able to achieve higher speeds than those available with the use of commutator-equipped universal motors or induction motors supplied directly from the mains.

This requires, however, a motor with which the supply of current is controlled electronically, hereinafter referred to as an electronic motor. With a few exceptions, present day electronic motors are intended to include electronically reversible rotation, which as before mentioned is not required in several, very wide areas in which such motors are used, and consequently electronic motors have not been used in many extensive fields of use, for reasons of economy. The major part of the costs of present day electronic motors, for instance, induction motors to which current is supplied via frequency converters, lies in the supply electronics. The main components of the frequency converter, e.g. the power transistors, are responsible for a highly significant part of these costs. FIG. 1 of the accompanying drawings illustrates a conventional and quite common embodiment of the inverter part of a frequency converter intended for controlling electronically the supply of electric current to an induction motor having, for instance, a power range of 0.5-2.5 kW. This inverter contains no less than six MOSFET-type transistors with associated drive circuits, and twelve rapid diods. Consequently, in order to reduce radically the costs of an electric motor that has electronically controlled power supply facilities, it is necessary to lower radically the cost of the supply electronics. In other words, it is necessary to use much simpler electronics containing fewer components.

Accordingly, an object of this invention is to provide an electric motor which will enable the supply of power thereto to be controlled electronically with the aid of much simpler supply electronics containing far less components than present day known electronic motors.

This object is achieved with an electronic motor constructed in accordance with the present invention and having the essential characteristic features set forth in claim 1. Advantageous further developments and embodiments of the inventive motor have the characteristic features set forth in claims 2-12. Distinct from the majority of present day known electronic motors, the inventive electronic motor is not constructed for electronic reversible rotation, but will only rotate in one pre-determined direction. This pre-determined direction can only be changed by mechanical modification of the motor. As before mentioned, this will have no importance in the large majority of fields in which such motor are used. claim 13 defines the characteristic features of an electronic supply circuit intended for a motor constructed in accordance with the invention.

The invention will now be described in more detail with reference to the accompanying drawings, in which FIG. 1 illustrates the aforedescribed construction of the inverter used in a frequency converter of the type generally used in present day electronic motors;

FIG. 2 is a schematic and principle end view of an exemplifying first embodiment of an electric motor constructed in accordance with the invention;

FIG. 3 is a spread sheet which illustrates schematically the configuration and arrangement of the stator poles and the rotor poles of the motor illustrated in FIG. 2;

FIG. 4 is a view similar to FIG. 3, illustrating an alternative rotor pole embodiment, which enables the rotational direction of the motor to be reversed with the aid of a simple, mechanical switching facility;

FIG. 5 is a schematic and principle side view, partly in axial section, of an exemplifying second embodiment of a motor constructed in accordance with the invention;

FIG. 6 is a sectional view of the motor according to FIG. 5, taken along the line VI—VI in FIG. 5;

FIG. 7 is a schematic spread view illustrating the configuration of the rotor used with the motor illustrated in FIGS. 5 and 6;

Figure 8:
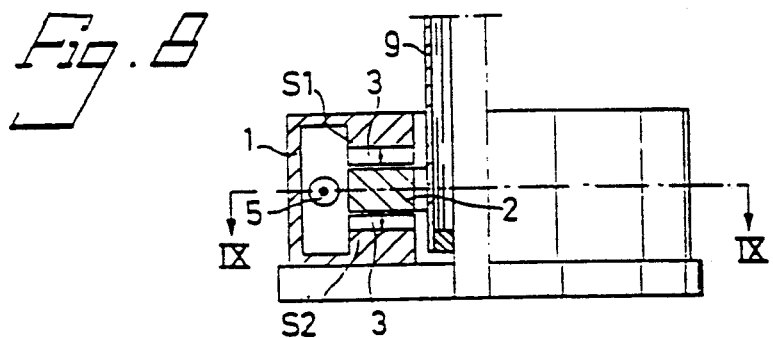
FIG. 8 is a schematic, principle side view, partly in axial section, of an exemplifying third embodiment of a motor constructed in accordance with the invention.

The inventive motor operates in accordance with the reluctance principle, wherein the ferromagnetic core on one of the two parts of the motor which rotate relative to one another is provided with both ferromagnetic and permanent-magnetic poles, which are magnetized with the aid of a magnetizing winding, whereas the ferromagnetic core of the other part of said motor is provided with salient, ferromagnetic reluctance poles.

FIGS. 2 and 3 illustrate schematically a first exemplifying embodiment of an inventive motor, comprising a stator 1 having a ferromagnetic core, and a rotor 2 having a ferromagnetic core and an intermediate, cylindrical air gap 6. The stator 1 includes an even number of magnetic pole groups, in the illustrated embodiment four groups, each of which has a salient permanent-magnetic pole 3 and a salient ferromagnetic pole 4. The permanent-magnetic polarity of the poles 3 is indicated in the drawings with the aid of arrows extending in the direction of the magnetic flux which the permanent magnets endeavour to drive. Each of the magnet pole groups comprising a permanently magnetic pole 3 and a ferromagnetic pole 4 is enclosed by part of a magnetizing winding 5, such that the permanently magnetic pole 3 and the ferromagnetic pole 4 of each magnet pole group is magnetized in mutually the same direction by the winding 5. The permanently magnetic poles 3 have mutually opposite polarities in mutually adjacent magnet pole groups, and mutually adjacent magnet pole groups are magnetized by the winding 5 in mutually opposite directions. An advantage is afforded when the winding 5 is arranged so that the magnetization generated thereby will oppose the polarity of the permanently magnetic poles 3.

FIG. 3 illustrates schematically the configuration of the stator poles and the rotor poles, and also shows the pole arrangement in a spread-out view. It will be seen from FIG. 3 that the permanently magnetic stator poles 3 and the ferromagnetic stator poles 4 are arranged with a constant pole pitch and with a slight interspace therebetween. Each pole may advantageously have a width in the peripheral direction corresponding to substantially two thirds of the pole pitch.

The ferromagnetic core of the rotor 2 is configured with the same number of salient, ferromagnetic reluctance poles 7 as there are magnetic pole groups on the stator i.e. in the illustrated embodiment four such reluctance poles. It will also be seen from FIG. 3 that the pole pitch of these reluctance poles 7 is twice that of the stator poles 3, 4. Each reluctance pole 7 has along approximately half of its axial length essentially the same peripheral width as a stator pole 3, 4, and over the remainder of its axial length a width which corresponds essentially to one half of a rotor pole pitch. Thus, each rotor pole 7 can be considered to comprise a main pole 7A of uniform width and a nose 7B which projects from the main pole. The noses 7B of all rotor poles project from respective main poles 7A in mutually the same peripheral direction.

When no current flows through the magnetizing winding 5, the rotor 2 has stable equilibrium states, in the illustrated embodiment four such states, in which the rotor poles 7 are positioned such as to fully cover the permanently magnetic stator poles 3. In these operational states of the rotor, each pole nose 7B extends peripherally forwards to the nearest located ferromagnetic stator pole. This position or state is hereinafter referred to as the start position. FIG. 3 shows the stator poles and the rotor poles in one such mutual position.

When the rotor is in its start position and current is supplied to the magnetizing winding 5 in the direction marked in FIG. 2, the rotor pole noses 7B are drawn in a direction towards adjacent ferromagnetic stator poles 4, while, at the same time, the holding force of the permanently magnetic stator poles 3 is weakened or possibly reduced down to zero. As a result, first the rotor pole noses 7B and then the main parts 7A of the rotor poles will be drawn in beneath the ferromagnetic stator poles 4. The mutual position between rotor and stator obtained in this way is referred to in the following as the indrawn position.

It will be seen that when the magnetizing current ceases to flow, when, or immediately prior to, reaching the indrawn position, the rotor will continue to rotate in a direction towards the next following start position, and that when the magnetizing current again begins to flow through the winding 5, when, or immediately prior to, reaching the next following start position, the rotor will continue to rotate. It will be understood from this that the current in the magnetizing winding 5 on the stator can be controlled with the aid of a single electronic switch, for example a transistor, and with the aid of a device which functions to detect the mutual rotational position between rotor and stator and to switch the switch on and off in response to the position detected.

When no current flows through the magnetizing winding 5, the rotor 2 is also able to adopt unstable equilibrium positions, in the illustrated embodiment four such positions, in which the rotor poles partially overlap the ferromagnetic stator poles 4. The motor, however, can also be started from such an unstable equilibrium position, since the supply of current to the winding 5 will result in the rotor 2 being drawn beyond the point of said unstable equilibrium position to an indrawn position.

When braking the motor electrically, i.e. generator operation, the winding 5 is supplied with current within the angular intervals occurrent when the rotor rotates from an indrawn position to a start position. No current is supplied during generator operation through the angular intervals in which current is supplied to the winding 5 during motor operation, and vice versa.

It will be understood that the exemplifying embodiment of the inventive motor illustrated in FIG. 2, 3 can be varied in several respects. For instance, the number of stator pole groups 3, 4 and the number of rotor poles 7 coacting therewith can have any desired even number whatsoever. Furthermore, each stator pole group may comprise several pairs of permanently magnetic poles 3 and ferromagnetic poles 4, wherein the poles 3 have mutually the same permanent-magnetic polarity within each pole group and all of both the ferromagnetic and permanently magnetic poles within one and the same pole group are magnetized in one and the same direction by the magnetizing winding 5. The number of rotor poles 7 in this case will naturally equal the total number of pairs of permanently magnetic and ferromagnetic stator poles, since the rotor pole pitch is twice as large as the stator pole pitch.

It will also be understood that the stator and rotor can change places in a motor constructed in accordance with the invention, so as to obtain a motor equipped with an external rotor. It will also be understood that, in principle, there is nothing to prevent the magetizing winding and the pole groups, consisting of permanently magnetic and ferromagnetic poles, from being arranged on the rotating part of the motor, while providing the reluctance poles on the stationary part thereof. This latter configuration, however, will naturally require the provision of slip-rings and brushes or like devices, for supplying current to the magnetizing winding.

It will be seen from the aforegoing that an inventive motor constructed in accordance with the FIG. 2, 3 illustration, will only rotate in one direction, this direction being determined by the direction in which the noses 7B extend peripherally from the main part 7A of the rotor poles 7.

An inventive motor constructed in accordance with the principles illustrated in FIGS. 2 and 3 and operating in the aforedescribed manner can be modified in a relatively simple fashion, such as to enable the rotational direction of the motor to be reversed, with the aid of a relatively simple mechanical adjustment. To this end, the rotor poles 7 are configured in the manner illustrated schematically in FIG. 4. In this case, the rotor poles 7 have an axial length which exceeds the active axial length of the stator poles 3, 4, this active axial length being referenced b in FIG. 4. Furthermore, each rotor pole 7 is provided with two outwardly projecting noses 7B and 7C of the aforedescribed kind, said noses being located on respective ends of the rotor pole 7 and directed in mutually opposite peripheral directions. The rotor is displaceable axially in relation to the stator, so as to enable to the rotor to be moved between two different working positions. In one of these working positions the rotor pole noses 7B are located within the active area of the stator poles 3, 4, and hence the motor will rotate in the direction determined by the noses 7B, whereas in the other of said working positions the noses 7C are located within the active area of the stator poles 3, 4 and the motor will thus rotate in the opposite direction, determined by the pole noses 7C. A motor of this construction can be used conceivably in those instances when the rotational direction of the motor need not be changed too often.

Other embodiments of the invention are also conceivable, such as the embodiment illustrated in FIGS. 5, 6 and 7 for instance. In the case of this embodiment, both the stator 1 and the rotor 2 are provided with two axially spaced pole rings. Each of the stator pole rings S1 and S2 consists of an equal number of permanently magnetic poles 3 and ferromagnetic poles 4, which are disposed alternately in the principle manner illustrated in FIG. 3. All of the permanently magnetic poles 3 located within one and the same pole ring S1 and S2 respectively have mutually the same permanent magnetic polarity in relation to the air gap but opposite polarity in relation to the permanently magnetic poles in the other pole ring. Thus, the two stator pole rings S1 and S2 are mutually the same, with the exception of the direction of the polarity of the permanently magnetic poles 3. The two rotor pole rings R1 and R2 are mutually identical and constructed in principle in the manner illustrated in FIG. 3. Each rotor pole ring R1 will thus include the same number of ferromagnetic reluctance poles 7 as the number of ferromagnetic poles 4 found in each stator pole ring S1, each such motor pole 7 being configured with a peripherally extending nose 7B which extends in the same direction for all rotor poles 7 in both rotor pole rings R1 and R2. The salient rotor poles 7 can be formed by corresponding recesses 8 in the peripheral surface of the cylindrical rotor core 2.

The stator pole rings S1, S2 are joined together by means of a ferromagnetic yoke, such as to enable magnetic flux to pass between the rings S1, S2 in an axial direction. The rotor pole rings R1, R2 are also connected together in a similar manner, by means of a ferromagnetic yoke, which conducts magnetic flux axially between the rotor pole rings R1, R2.

In the case of this embodiment, the magnetizing winding or stator winding 5, consists of one single circular coil winding, arranged on the stator core 1 between the two stator pole rings S1, S2. Conveniently, the direction of current flow in the winding 5 will be such as to counteract the field generated by the permanently magnetic poles 3 in the two stator pole rings S1, S2. It will be understood that the mutual positions of the stator pole rings S1, S2 and the rotor pole rings R1, R2 are such that both of the rotor pole rings R1, R2 will simultaneously adopt a start position in relation to respective stator pole rings S1, S2.

It will also be understood that the rotor pole rings of a motor constructed in accordance with FIGS. 5-7 may include any number of poles whatsoever.

Furthermore, it will be understood that the embodiment according to FIGS. 5-7 may be provided with a conical air gap instead of a cylindrical air gap.

It is also possible to construct an inventive motor with a planar air gap. One such embodiment is illustrated schematically in FIGS. 8 and 9. This embodiment can be obtained, in principle, from the embodiment illustrated and described in FIGS. 5-7, solely by changing the geometry of the stator core and the rotor core.

Figure 9:
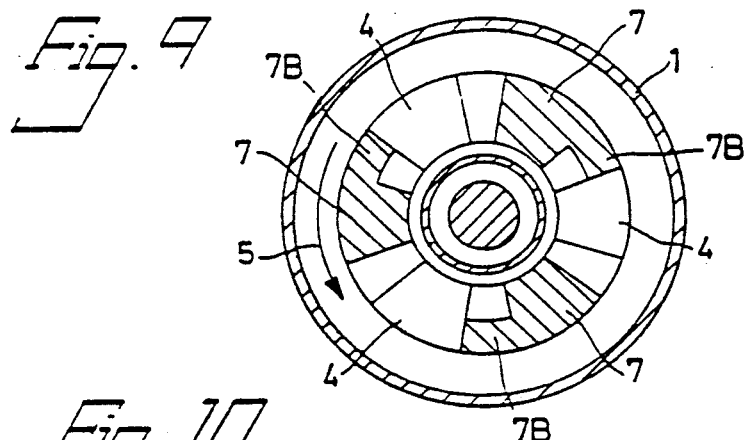
FIG. 9 is a sectional view of the motor shown in FIG. 8, taken along the line IX—IX in FIG. 8.

In the case of the embodiment illustrated in FIGS. 8 and 9, the stator core 1 has an annular configuration with a U-shaped radially and inwardly open cross-section, wherein the two legs of the U-shaped cross-section carry the two annular stator pole rings S1 and S2 which are planar in this case. Each of the stator pole rings S1 and S2 consists of an equal number of permanently magnetic poles 3 and ferromagnetic poles 4, arranged alternately to one another. The permanently magnetic poles 3 in the two stator pole rings S1, S2 have, in this case, polarities which are directed in mutually the same axial direction. In the case of this embodiment, each stator pole ring S1, S2 includes three permanent magnetic poles 3 and three ferromagnetic poles 4.

The rotor 2 mounted on the motor shaft 9, which may be a stably journalled tubular shaft for instance, is located between the two planar, annular stator pole rings S1, S2 and may have the form of a ferromagnetic ring the surfaces of which facing towards the stator pole rings S1, S2 are configured with rotor poles in accordance with the aforedescribed principle. In the case of this embodiment, the rotor 2, however, may simply consist of radially projecting ferromagnetic arms, the number of which corresponds to the number of ferromagnetic poles 4 in the stator pole rings S1, S2 and each of which forms a respective rotor pole 7 with the nose 7B extending in one peripheral direction, as will best be seen from FIG. 9.

In the case of this embodiment, the magnetizing, or stator winding 5 consists of a single, circular coil winding which is arranged within the U-shaped crosssection of the annular stator core 1, in the manner illustrated schematically in the drawing.

The embodiment of the invention illustrated in FIGS. 8 and 9 can be used advantageously for driving centrifuges, agitators, mixers, bobbins for spinning heads, and like machines.

It will be seen that when the current flows through the motor winding of the motor according to FIGS. 5-9, the motor is also magnetized axially. If, as a result hereof, the magnetic leakage field is so powerful as to have a disturbing effect on the ambient surroundings of the motor, the leakage field can be considerably reduced, by configuring the motor with two stators and two rotors of mutually the same type, but with windings whose axial magnetic fields will counteract one another. This enables both of the windings to be supplied from a common electronic supply circuit.

The magnetic noise which always occurs when the magnetic forces acting between stator and rotor vary with time and in space, such as in the case of a motor constructed in accordance with the invention, can be reduced in a manner known from other electromachines, by slanting the limiting lines of the rotor poles and/or by making the pole pitch of the motor poles slightly uneven.

It will be understood from the aforegoing that a motor constructed in accordance with the invention is provided with one single winding in which current need only flow in one direction. Consequently, the supply of current to an inventive motor can be effected with the aid of a single switch device controlled in response to the angular position of the rotor relative to the stator.

When the magnetomotive force of the stator winding decreases, the magnetic field energy in the motor will also decrease. The field energy thus released should preferably thus be returned to the supply source, or alternatively converted to heat in a resistor.

Figure 11:
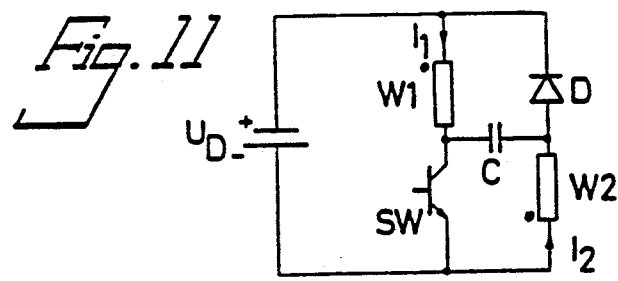
FIG. 11 illustrates an advantageous electronic supply circuit for use with a motor constructed in accordance with the present invention.

FIG. 11 illustrates a particularly advantageous embodiment of an electric circuit intended for supplying current to an inventive motor from a d.c. source $U_D$, which may be a galvanic battery, or a capacitor bank connected to a mains-supplied rectifier bridge, for instance. In order to enable magnetic field energy to be fed back to the voltage source $U_D$, the inventive motor is provided, in addition to the aforesaid magnetizing or working winding, referenced W1 in FIG. 11, with a return winding W2, which is wound as a secondary winding of the working winding W1. Thus, the return winding W2 is arranged in the motor physically parallel with the working winding W1 and has the same number of turns as said working winding, although in certain instances the return winding W2 may have a significantly smaller conductor area. Alternatively, the two windings W1 and W2 may also be wound in a bifilar fashion. In this case, voltages of equally high values will be induced in the two windings W1 and W1 when the magnetic field through the windings changes.

The supply circuit includes an electronic switching device SW, for instance a transistor, which is controlled in response to the angular position of the rotor relative to the stator and which is connected in series with the working winding W1 of the motor, between the two poles of the voltage source $U_D$. The supply circuit also includes a diode D, which is connected in series with the return winding W2, between the two poles of the voltage source $U_D$, in a manner such that the ends of similar polarity of the two windings W1, W2 with respect to the voltages induced in said windings are each connected to a respective pole of the voltage source $U_D$, said ends being marked with dots in FIG. 11, and such that the current flow direction of the diode D is opposite to the current flow direction of the switching device SW. Furthermore, the supply circuit includes a capacitor C which is connected between the other ends of the two windings W1 and W2. The voltage across the capacitor C is essentially equal to the voltage of the voltage source $U_D$, irrespective of the voltage induced in the windings W1 and W2.

When the transistor SW is made conductive, current begins to flow through the working winding W1. When the transistor SW begins to become non-conductive, the voltage across the transistor increases to about 2 $U_D$, prior to the diode D taking over the current $I_1$ flowing through the winding W1. Subsequent to these events taking place, the return winding W2 also begins to conduct current $I_2$. The manner in which the current flow is divided between the windings W1 and W2 has no significance with respect to the magnetic circuit of the motor. Consequently, an increase in $I_2$ will result immediately in a decrease in $I_1$. In other words, current is conducted in the return winding W2 instead of the working winding W1. Because of the incomplete magnetic coupling between the windings W1 and W2, only an insignificant part of the recycled energy will be taken up in the capacitor C. The larger part of the field energy released is fed back to the voltage source $U_D$, through the diode D. If the transistor SW is made conductive prior to decay of the current $I_2$ in the return winding W2, the residual current is taken over by the working winding W1, in a course of events similar to that described above.

The relationship between the total current conducted by the motor winding $I=I_1+I_2$ and the air-gap torque T of the motor can be expressed as $$T = T(PM)(\alpha) + I \cdot k(\alpha)$$

where $T_{PM}(\alpha)$ is the air gap torque with no current through the stator winding as a result of the permanently magnetic poles of the stator;

$\alpha$ is the angular position of the rotor relative to the stator, $k(\alpha)$ is a torque factor.

Figure 10:
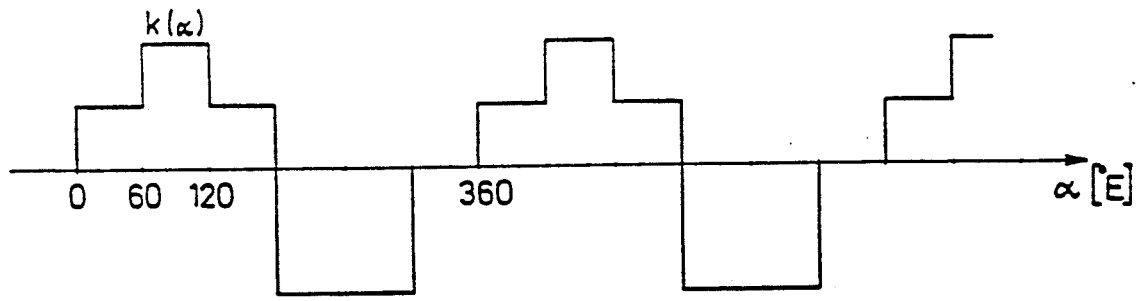
FIG. 10 is a diagram suitable for use when accounting for the torque development of a motor according to the invention.

The torque factor $k(\alpha)$ is a periodic function of the angular position of the rotor relative to the stator. FIG. 10 illustrates the typical variation of the torque factor $k(\alpha)$ as a function of the angular position $\alpha$ of the rotor in electric degrees, when a notinsignificant total current in the preferred direction is assumed to be present in the motor winding. The simplest possible form of current supply to an inventive motor is obtained when the motor winding is supplied with rectangular current pulses, i.e. the current has either a specific constant value or is zero. It can be shown mathematically, however, that the mean value of the air gap torque of the motor can be maximized irrespective of the magnitude of the losses in the motor winding, when the total motor current is varied in the same manner as the positive part of the function $k(\alpha)$. This applies to motor operation. In the case of generator operation, the current passing through the motor winding shall have the same shape as the negative part of the function $k(\alpha)$, although with reversed sign.

The gain achieved in motor torque when modulating the amplitude of the current within a current conducting interval, compared with maintaining the current amplitude constant within said current interval, may be as high as 6% in the form of improved machine performance, in a typical case. At the same time, however, the peak current values also increases, and therewith the current load on the switching device used (SW in FIG. 11) by a factor of $\sqrt{2}=1.41$. A suitable compromise may be to increase the peak value of the current by about 25% in comparison with a purely rectangular current pulse of constant amplitude, which would result in a torque increase of about 5%. It should be observed in this context, however, that modulation of current strength within the current conducting interval in accordance with the aforegoing requires the device used to detect the angular position of the rotor relative to the stator to have a correspondingly larger angular resolution.

I claim:

1. An electric motor comprising a first part and a second part which are rotatable relative to another and each of which has a ferromagnetic core and which are separated by an air gap lying between said cores, characterized in that the ferromagnetic core of said first part has provided on a surface thereof facing the air gap, a plurality of magnet pole groups disposed sequentially and peripherally in the direction of mutual rotation of said parts; in that each of said magnet pole groups includes at least one pair of a salient ferromagnetic pole and a salient permanently magnetic pole, which are arranged peripherally in mutually spaced relationship in said rotational direction and which are coupled magnetically to a magnetizing winding for magnetization of both the ferromagnetic and the permanently magnetic pole at the same time and in the same direction, the poles within each magnet pole group as well as of mutually adjacent magnet pole groups having an equal constant pole pitch; in that he ferromagnetic core of the other part s provided on a surface thereof facing said air gap and opposite the magnet pole groups on the ferromagnetic core of the first part with a ring of salient ferromagnetic reluctance poles extending peripherally in said rotational direction with a pole pitch corresponding to twice the pole pitch of the magnet poles on the ferromagnetic core of the first part; in that each of said reluctance poles has a width in said peripheral direction which over a part of the reluctance pole corresponds essentially to the pole pitch of the magnet poles on the ferromagnetic core of the first part and which over the remaining part of the reluctance pole is smaller and corresponds essentially to the peripheral width of the magnet poles on the ferromagnetic core of the first part, in a manner such that each reluctance pole presents a part which projects in a predetermined peripheral direction common to all reluctance poles.

2. A motor as claimed in claim 1, wherein the direction of magnetization achieved by the magnetizing winding is opposite to the permanent magnetic polarity of the permanently magnetic poles.

3. A motor as claimed in claim 1, wherein the ferromagnetic and permanently magnetic poles on the ferromagnetic core of the first part have a width in the peripheral direction which corresponds essentially to two-thirds of the pole pitch of said magnet poles.

4. A motor as claimed in claim 1, wherein the peripherally projecting part of each reluctance pole has an axial length which corresponds to substantially half the total axial length of the reluctance pole.

5. A motor as claimed in claim 1, wherein said first part is stationary and said second part is rotatable.

6. A motor as claimed in claim 1, wherein the air gap is cylindrical; in that the ferromagnetic core of said first part has an even number of said magnet pole groups disposed in a peripheral ring; the permanently magnetic poles have oppositely directed permanent magnetic polarities in mutually adjacent magnetic pole groups, and different magnet pole groups are embraced by different parts of the magnetizing winding in a manner such that mutually adjacent magnet pole groups are magnetized in mutually opposite directions by the magnetizing winding.

7. A motor as claimed in claim 6, wherein each magnet pole group on the first part includes several, peripherally and sequentially located pairs of a ferromagnetic pole and a permanently magnetic pole, all permanently magnetic poles in one and the same pole group having the same permanent magnetic polarity.

8. A motor as claimed in claim 1, wherein the air gap is cylindrical; the ferromagnetic core of the first part has provided on the surface thereof facing the air gap two axially spaced and peripherally extending rings on said magnet pole groups, the permanently magnetic poles in said two rings, having oppositely directed permanent magnet polarities relative to the air gap; the magnetizing winding comprises a coil winding which extends coaxially in relation to the air gap and which is located between said magnet pole rings; and the ferromagnetic core if the second part has provided on the surface t hereof facing said air gap two peripherally extending rings of said reluctance poles located opposite the magnetic pole rings on the ferromagnetic core of said first part.

9. A motor as claimed in claim 6, wherein each reluctance pole has an axial length which is greater than the axial length of the magnet poles on the first part and is configured with two parts which project peripherally in opposite directions and each of which is located on a respective axial end of the reluctance pole; and the first part and the second part of the motor can be displaced axially in relation to one another to alternatively a first working position in which the reluctance pole parts projecting in one peripheral direction are located opposite the magnet poles on the first part, or a second working position in which the reluctance pole parts projecting in the opposite peripheral direction are located opposite the magnet poles on the first part.

10. A motor as claimed in claim 1, wherein the ferromagnetic cores of the first part and the second part are separated by two, annular, planar and axially spaced air gaps which are concentrical with the mutual rotational axis of said parts and between which the ferromagnetic core of the second part is located; said ferromagnetic core of said second part is configured with a planar, annular ring of said reluctance poles facing towards each of the two air gaps, whereas the ferromagnetic core of the first part has an annular configuration with a substantially U-shaped and radially inwards open cross-section, the two legs of which U-shaped cross-section are located on opposite sides of the ferromagnetic core of the second part on the opposite side of said air gaps and are each provided with a respective planar, annular ring of said magnet pole groups; all permanently magnetic poles have the same axially directed permanent magnetic polarity; and the magnetizing winding consists of a coil winding arranged concentrically in relation to the common rotational axis, inwardly of the yoke part of the U-shaped cross-section of the ferromagnetic core of said first part.

11. A motor as claimed in claim 1, wherein the motor includes a further winding arranged in the same manner as the magnetizing winding and with the same number of winding turns as said magnetizing winding, so that equally large voltages are induced in the magnetizing winding and the further winding in response to changes in the magnetic flux through the windings.

12. A motor as claimed in claim 11, wherein the magnetizing winding and the further winding have a bifilar winding configuration.

13. A device for supplying a motor accordance to claim 11, comprising a direct voltage source; a switch device which is controlled in response to the mutual angle of rotation between the two parts of said motor and which is connected in series with the magnetizing winding of the motor between the two poles of the voltage source; a diode connected in series with the further winding of the motor between the poles of the voltage source in a manner such that with respect to the voltages induced in the windings the magnetizing winding and the further winding have like-polar ends connected to respective poles of the voltage source and the current direction in the diode is opposite to the current direction of the switching device; and a capacitor connected between the other ends of the two windings.

* * * * *